US012706382B2

(12) United States Patent
Xu et al.

(10) Patent No.: US 12,706,382 B2
(45) Date of Patent: Aug. 11, 2026

(54) SCALABLE 2-D JOINT PHASE-TIME ARRAYS AND BEAMFORMING OPERATION

(71) Applicant: Samsung Electronics Co., Ltd., Suwon-si (KR)

(72) Inventors: Gang Xu, Allen, TX (US); Shadi Abu-Surra, Plano, TX (US); Shenggang Dong, Dallas, TX (US); Won Suk Choi, McKinney, TX (US); Young Han Nam, Plano, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 18/437,046

(22) Filed: Feb. 8, 2024

(65) Prior Publication Data

US 2024/0313398 A1 Sep. 19, 2024

Related U.S. Application Data

(60) Provisional application No. 63/452,628, filed on Mar. 16, 2023.

(51) Int. Cl.
*H01Q 21/06* (2006.01)
*H01Q 3/36* (2006.01)

(52) U.S. Cl.
CPC ............. *H01Q 3/36* (2013.01); *H01Q 21/061* (2013.01)

(58) Field of Classification Search
CPC ............................... H01Q 3/36; H01Q 21/061
See application file for complete search history.

(56) References Cited

U.S. PATENT DOCUMENTS

| | | | |
|---|---|---|---|
| 9,768,501 | B2 | 9/2017 | Maltsev et al. |
| 9,935,367 | B2 | 4/2018 | Tiebout et al. |
| 10,148,008 | B2 | 12/2018 | van de Water |

(Continued)

FOREIGN PATENT DOCUMENTS

| | | | |
|---|---|---|---|
| CN | 115101936 | A | 9/2022 |

OTHER PUBLICATIONS

Park, H., et al., "4.1 A 39GHz-Band CMOS 16-Channel Phased-Array Transceiver IC with a Companion Dual-Stream IF Transceiver IC for 5G NR Base-Station Applications", IEEE International Solid-State Circuits Conference, Feb. 1, 2020, 3 pages.

(Continued)

*Primary Examiner* — Awat M Salih

(57) ABSTRACT

Scalable 2D joint phase-time arrays (JPTA) support multiple simultaneous RF beams without sacrificing array gain. A 2D JPTA comprises M antenna groups that each comprise N antennas, each coupled to one of N phase shifters. The array comprises M delay elements configured to: apply a time delay to a first signal to be transmitted by one of the antenna groups while each phase shifter in the group phase shifts the time-delayed first signal and feeds the phase-shifted-and-time-delayed first signal to the corresponding antenna, or apply the time delay to a second signal received from the group while each phase shifter phase shifts a third signal received from the antenna, the second signal being a combination of the phase-shifted third signals. The time delays produce a beam spread in a first dimension of the array such that multiple beams are formed in different directions.

20 Claims, 16 Drawing Sheets

(56) References Cited

U.S. PATENT DOCUMENTS

| | | | |
|---|---|---|---|
| 10,256,894 B2 | 4/2019 | Eitan et al. | |
| 11,677,145 B1 * | 6/2023 | Sharma ................ | H01Q 3/2682<br>342/372 |
| 2014/0357319 A1 | 12/2014 | Maltsev et al. | |
| 2017/0358866 A1 | 12/2017 | Xian et al. | |
| 2020/0388916 A1 | 12/2020 | Kahrizi et al. | |
| 2022/0320727 A1 | 10/2022 | Molla Aghajanzadeh et al. | |
| 2023/0075523 A1 | 3/2023 | Paidimarri et al. | |

OTHER PUBLICATIONS

International Search Report and Written Opinion issued Jun. 18, 2024 regarding International Application No. PCT/KR2024/002592, 10 pages.

Zhai et al., "THzPrism: Frequency-Based Beam Spreading for Terahertz Communication Systems", IEEE Wireless Communications Letters, vol. 9, No. 6, Jun. 2020, pp. 897-900.

* cited by examiner

SCALABLE 2-D JOINT PHASE-TIME ARRAYS AND BEAMFORMING OPERATION

CROSS-REFERENCE TO RELATED APPLICATION AND CLAIM OF PRIORITY

This application claims priority under 35 U.S.C. § 119(e) to U.S. Provisional Patent Application No. 63/452,628 filed on Mar. 16, 2023, which is hereby incorporated by reference in its entirety.

TECHNICAL FIELD

This disclosure relates generally to antenna arrays in wireless communications systems. Embodiments of this disclosure relate to methods and apparatuses for scalably arranging antenna elements of a 2D antenna array in groups with a shared time delay to facilitate combining vertical beam steering and horizontal beam spreading to generate a frequency dependent beam spread.

BACKGROUND

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHZ, to enable robust coverage and mobility support. To decrease propagation loss of the radio waves and increase the transmission distance, the beamforming, massive multiple-input multiple-output (MIMO), full dimensional MIMO (FD-MIMO), array antenna, analog beam forming, and large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-point (COMP), reception-end interference cancelation and the like.

Analog beamforming systems have been widely used in wireless communication systems to overcome excessive path loss. The challenge for an analog beamforming system is that beamforming is achieved in the time domain. Therefore, typically only one beam can be formed at a time. This limits the beam pairing and beam tracking capability when multiple users are in the cell to be connected to the base station at the same time, due to the beam switching overhead. It is also challenging for the uplink in the Time Division Duplex (TDD) system because the user only gets allocated in a short period of time to transmit. There is a need for a multi-beam system that supports multiple simultaneous radio frequency (RF) beams without sacrificing the antenna array gain.

SUMMARY

Embodiments of the present disclosure provide methods and apparatuses that facilitate the design of scalable two-dimensional (2D) joint phase-time arrays (JPTA) that support multiple simultaneous RF beams without sacrificing the antenna array gain.

In one embodiment, a 2D antenna array is provided, comprising a first number (M) of antenna groups that each comprise a second number (N) of antenna elements and N phase shifters, each antenna element operably coupled to a corresponding one of the phase shifters. The 2D antenna array further comprises M delay elements, each delay element operably coupled to a corresponding one of the antenna groups and configured to apply a respective time delay to a first signal to be transmitted by the corresponding antenna group, wherein each phase shifter in the corresponding antenna group is configured to apply a respective phase shift to the time-delayed first signal and feed the phase-shifted-and-time-delayed first signal to the corresponding antenna element. Each delay element is further configured to apply the respective time delay to a second signal that is received from the corresponding antenna group, wherein each phase shifter in the corresponding antenna group is configured to apply the respective phase shift to a third signal received from the corresponding antenna element, and wherein the second signal is a combination of the phase-shifted third signals. The antenna groups are further configured to form multiple beams based on the phase shifts and the time delays. The time delays are configured to produce a beam spread in a first dimension of the 2D antenna array such that the multiple beams are formed in different directions.

In another embodiment, a method of operation of a 2D antenna array comprising a first number (M) of antenna groups that each comprise a second number (N) of antenna elements and N phase shifters, each antenna element operably coupled to a corresponding one of the phase shifters, and M delay elements each operably coupled to a corresponding one of the antenna groups, is provided. The method comprises the steps of applying, by each of the delay elements, a respective time delay to a first signal to be transmitted by the corresponding antenna group and applying, by each phase shifter in the corresponding antenna group, a respective phase shift to the time-delayed first signal and feeding the phase-shifted-and-time-delayed first signal to the corresponding antenna element, or applying, by each of the delay elements, the respective time delay to a second signal that is received from the corresponding antenna group and applying, by each phase shifter in the corresponding antenna group, the respective phase shift to a third signal received from the corresponding antenna element, wherein the second signal is a combination of the phase-shifted third signals. The method further comprises forming multiple beams based on the phase shifts and the time delays. The time delays are configured to produce a beam spread in a first dimension of the 2D antenna array such that the multiple beams are formed in different directions.

In another embodiment, a non-transitory computer-readable medium is provided. The non-transitory computer-readable medium is configured to store instructions that, when executed by a processor, cause a 2D antenna array comprising a first number (M) of antenna groups that each comprise a second number (N) of antenna elements and N phase shifters, each antenna element operably coupled to a corresponding one of the phase shifters, and M delay elements each operably coupled to a corresponding one of the antenna groups, to apply, via each of the delay elements, a respective time delay to a first signal to be transmitted by the corresponding antenna group and apply, via each phase shifter in the corresponding antenna group, a respective phase shift to the time-delayed first signal and feed the phase-shifted-and-time-delayed first signal to the corresponding antenna element. The instructions, when executed, further cause the 2D antenna array to apply, via each of the delay elements, the respective time delay to a second signal that is received from the corresponding antenna group and apply, via each phase shifter in the corresponding antenna group, the respective phase shift to a third signal received from the corresponding antenna element, wherein the second signal is a combination of the phase-shifted third signals. The instructions, when executed, further cause the 2D antenna array to form multiple beams based on the phase shifts and the time delays. The time delays are configured to produce a beam spread in a first dimension of the 2D antenna array such that the multiple beams are formed in different directions.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that a joint phase-and-timed array (JPTA) architecture can allow multiple UEs to be connected to a base station simultaneously, reducing the need for time multiplexing which allows the base station to allocate more time for individual UEs, increasing the SNR at the receiver side. This allows support for longer range, higher data rate, or reduced UE transmit power requirements to reduce the power consumption of the UE.

However, embodiments of the present disclosure further recognize that implementations of the JPTA architecture that require one delay element for each antenna element can increase system complexity, cost, and power consumption of the base station significantly. Additionally, adding these delay elements to a 2D array could violate spacing constraints in mmWave systems, preventing the JPTA architecture from being scalable to a 2D array.

Accordingly, embodiments of the present disclosure arrange multiple antenna elements in groups that share one delay element. Each antenna element is connected to its own RF front end circuits, and the shared one delay element is configured for a beam spread to support multiple beams in different directions. Such architectures allow combining vertical beaming steering and horizontal beam spreading to generate a frequency dependent beam spread.

Figure 1:
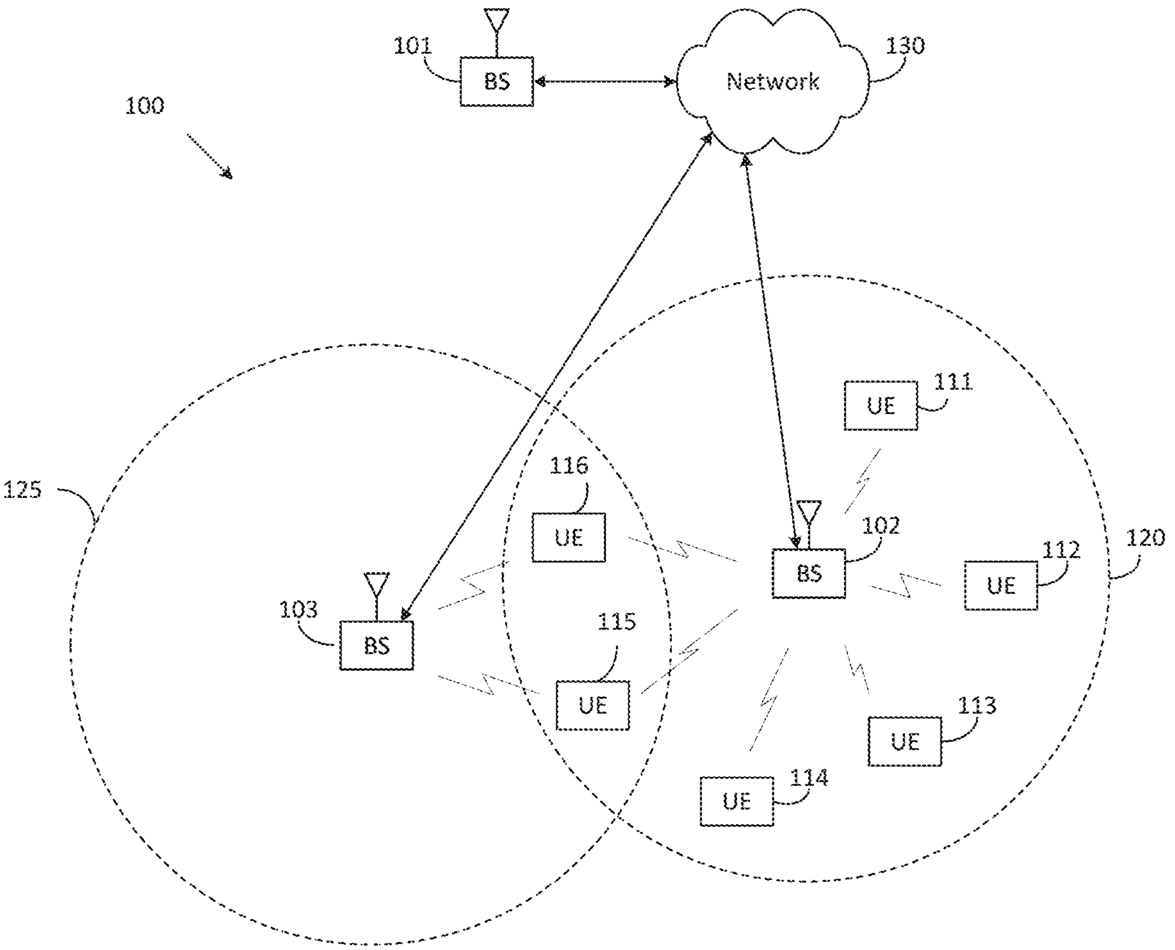
FIG. 1 illustrates an example wireless network according to various embodiments of the present disclosure.
Figure 2:
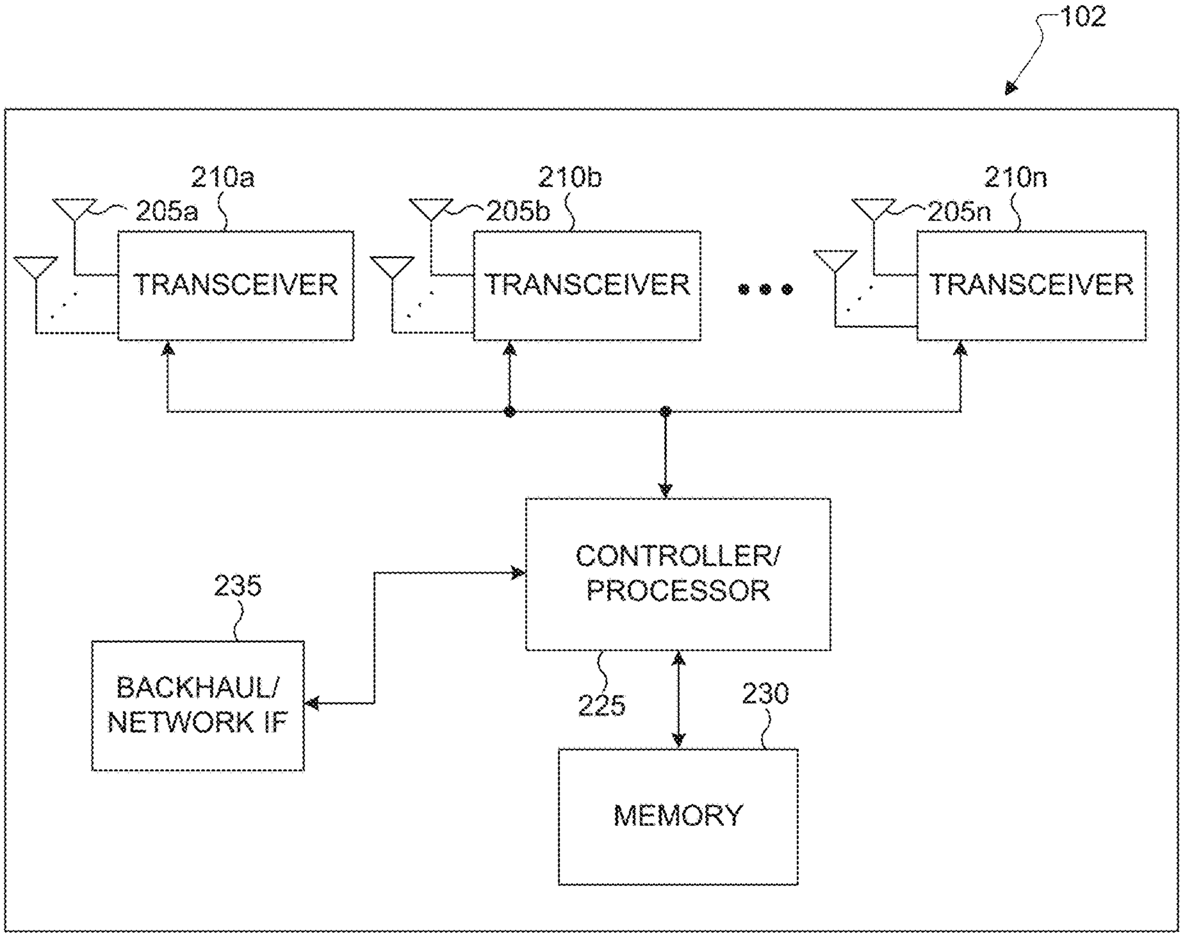
FIG. 2 illustrates an example gNB according to embodiments of the present disclosure.
Figure 3:
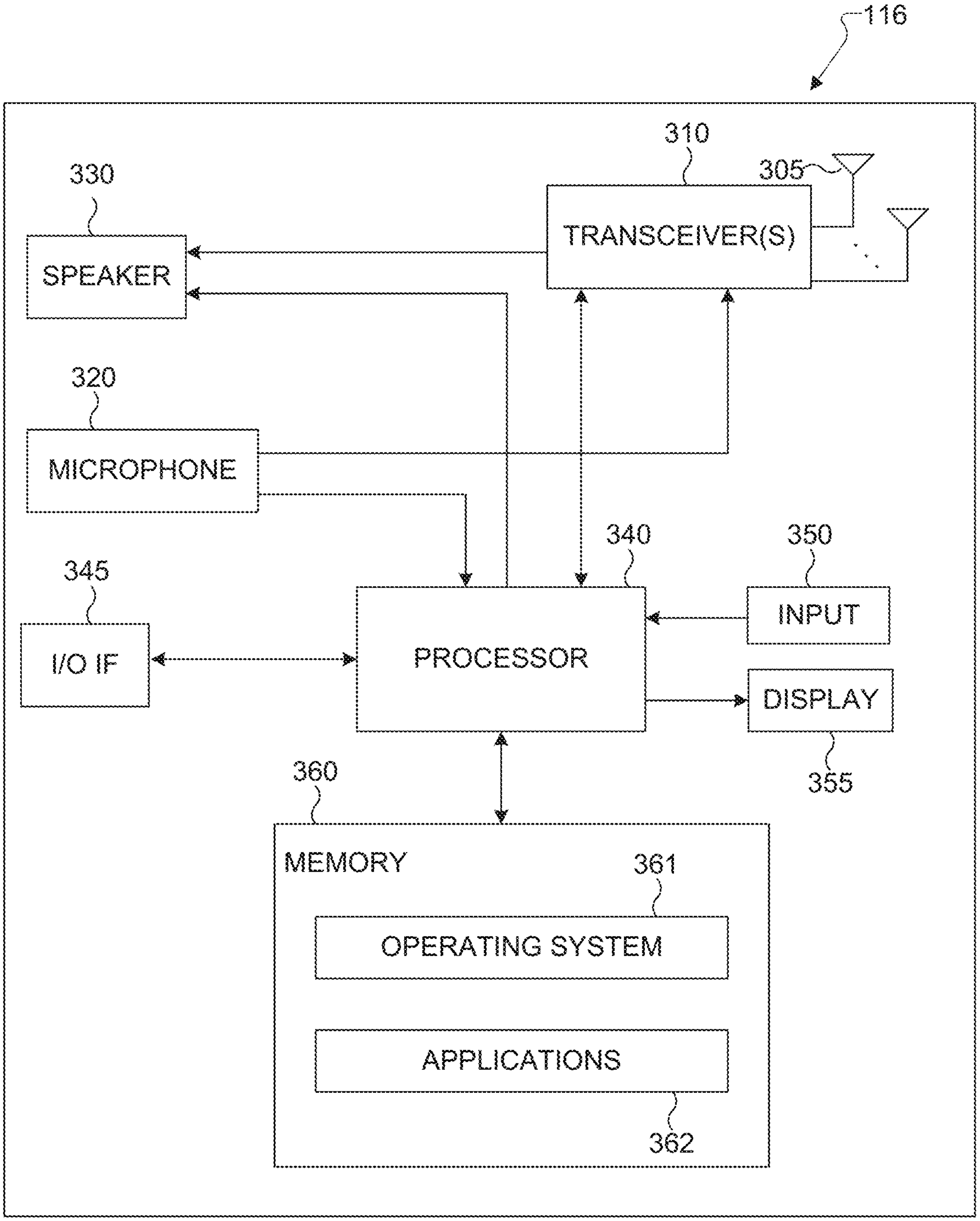
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
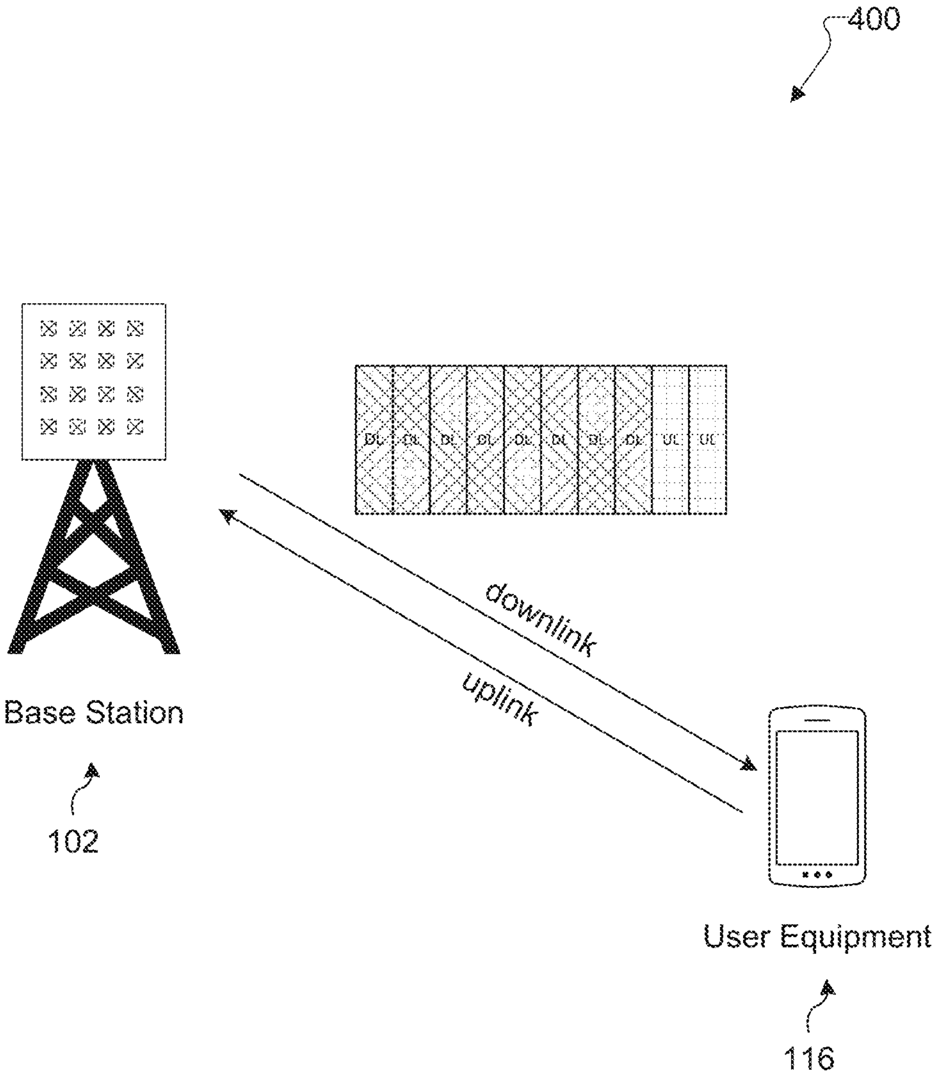
FIG. 4 illustrates an example phased-array system using TDD according to embodiments of the present disclosure.

FIG. 4 illustrates an example phased-array system 400 using TDD according to embodiments of the present disclosure. mmWave base stations (e.g., a gNB 102) can employ phased-array technology to achieve high beamforming gain to overcome the excessive path loss that can result from the use of mmWave frequencies. TDD systems rely on time division multiplexing of the downlink and uplink traffic of multiple users through separate time slots.

Figure 5:
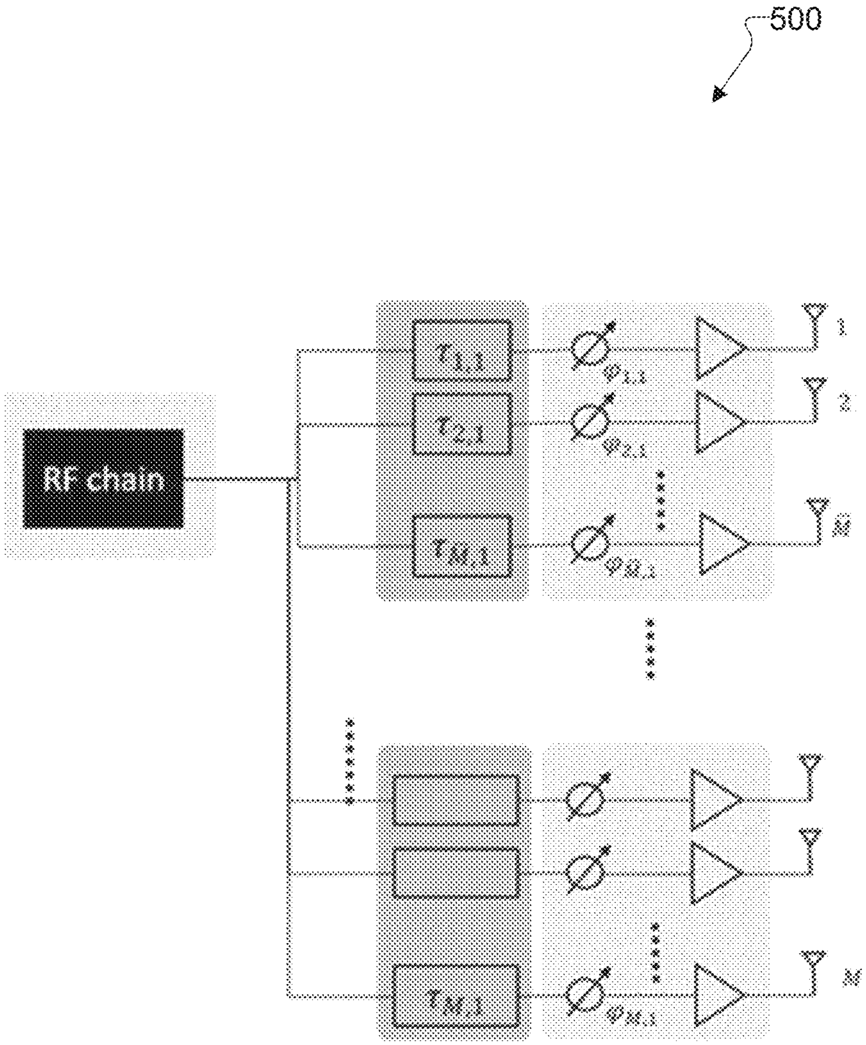
FIG. 5 illustrates an example of joint phase-time array architecture according to embodiments of the present disclosure.

FIG. 5 illustrates an example of joint phase-time array architecture 500 according to embodiments of the present disclosure. The JPTA architecture 500 can provide simultaneous service with full beamforming gain for several users in a localized region, or in scenarios in which link reliability and easy beam-tracking are desired, or in which fast initial beam-alignment is desired.

In this architecture there are M antenna elements, and the number of phase shifters and number of delay elements are both set to M—that is, there is one phase shifter and one delay element coupled to each antenna. Antenna m is designed to have a delay variation $\tau_{m,1} \in [0, (m-1)\sin(\Delta\theta_{max})/W]$, where W is the system bandwidth and $\Delta\theta_{max}$ is the maximum desired beam-sway in one direction from the center angle.

Figure 6:
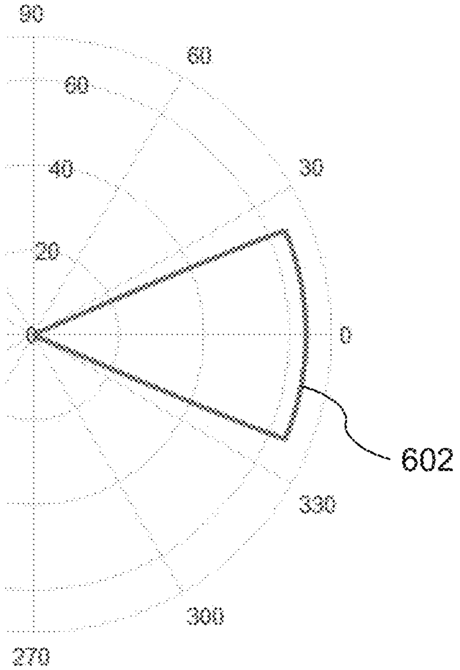
FIG. 6 illustrates an example of the achievable behavior of JPTA-based beamforming according to embodiments of the present disclosure.
Figure 6:
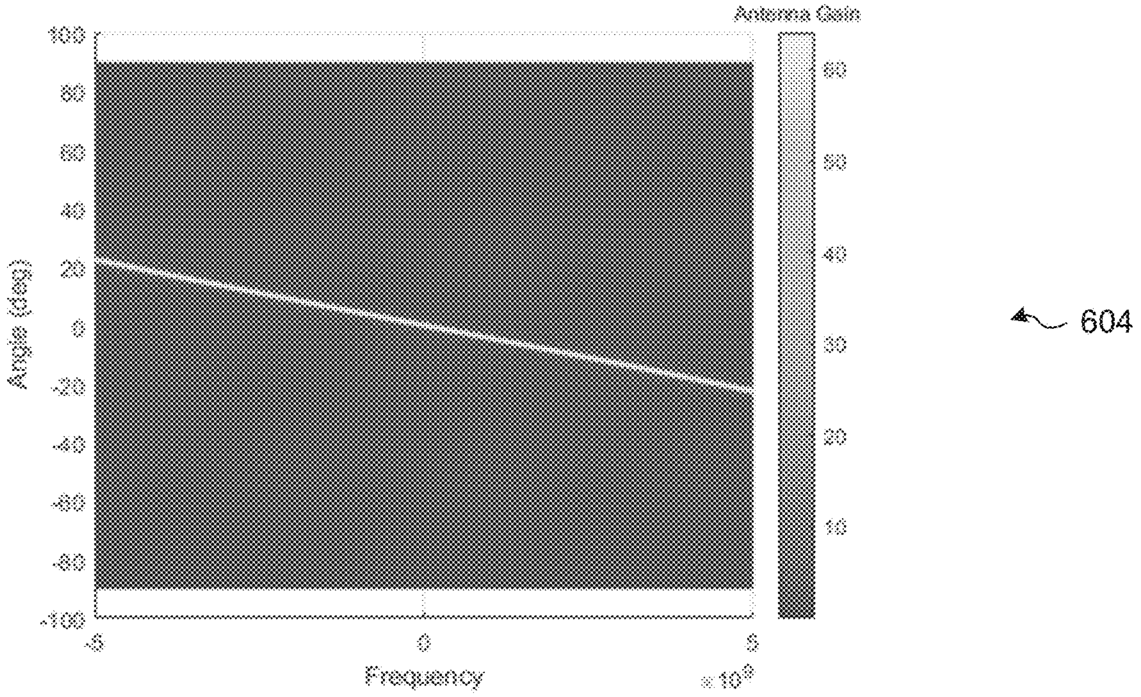

FIG. 6 illustrates an example of the achievable behavior of JPTA-based beamforming according to embodiments of the present disclosure. This example illustrates the achievable antenna gain for a transmission from a half-wavelength spaced uniform linear antenna array with M=64, center angle $\theta_1=0$, and $\Delta\theta_{max}=\pi/8$. As can be seen in graph 604, this design can achieve the desired frequency dependent beam pattern within the angular region 602.

In this architecture, for each angle in the vicinity of $\theta_1$, there is a unique frequency region where the peak beamforming gain is obtained. Thus, in fast user mobility scenarios, by observing the frequency or sub-carrier where the highest signal power is obtained, the receiver can estimate the best beam direction or the required beam correction to be used at the transmitter. Thus, fast beam-alignment can be achieved using this architecture. Furthermore, as the user moves away by more than a 3 dB beam-width on one frequency, the signal to noise ratio (SNR) does not completely fall to zero on the whole band. Rather, the maximum beamforming gain shifts to a different frequency. This can be beneficial since it can provide a smooth degradation of service with user mobility and does not cause sudden outage as in the case of frequency-flat beamforming.

It is also noted that in the cell edge case, the UE transmitter typically has to boost the transmit output power for the base station (i.e., the gNB) to receive its signal above the sensitivity level. However, the transmit power is bounded by regulatory and absorption rate limitations. Therefore, the UEs could be power limited. JPTA allows multiple UEs to be connected to a base station simultaneously, reducing the need for time multiplexing. This essentially allows the base station to allocate more time for the cell edge UEs through JPTA, resulting in higher SNR at the receiver side that can support longer range, higher data rate, or reduced UE transmit power requirements to reduce the power consumption.

However, such implementations of the JPTA architecture require one delay element for each antenna element (as illustrated in architecture 500). A large number of antennas are deployed in a commercial base station, typically arranged in a 2D antenna array. Such arrays can have dimensions as large as 16×16, for example. In this case, 256 delay elements would be needed. Inclusion of one delay element per antenna in such an array increases the system complexity, cost, and power consumption significantly.

The 2D phased-array system may also require near λ/2 spacing between antenna elements. At mmWave frequencies the wavelength is very short, which limits the dimensions of the transceiver ICs since, on average, each channel may need to be smaller than λ/2×λ/2 in size in order to make the 2D array scalable. Adding extra delay elements could violate such spacing constraints, preventing the JPTA architecture from being scalable to a 2D array.

Various embodiments of the present disclosure provide a JPTA architecture that organizes the antenna elements in groups, so that multiple antennas can share one delay element. Each antenna element is connected to its own RF front end circuits, such as a power amplifier (PA), low-noise amplifier (LNA), and phase shifter (PS) for the RF signal amplification and phased-array operation. There are multiple methods to group the antennas, where each group can be arranged in multiple different horizontal and vertical dimensions, based on the system performance and integrated circuit partitioning.

Figure 7:
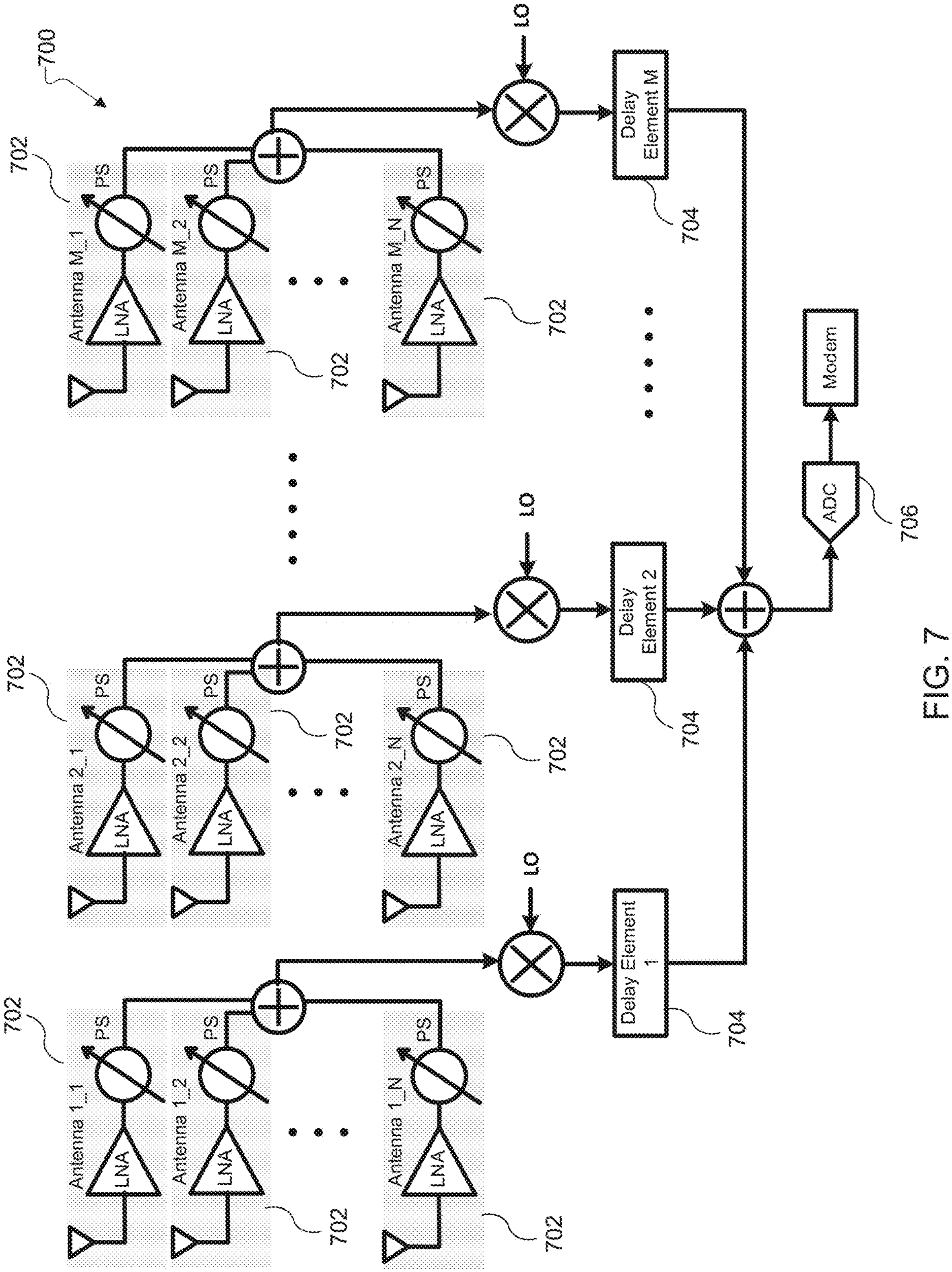
FIG. 7 illustrates an example 2D JPTA receiver architecture according to embodiments of the present disclosure.

FIG. 7 illustrates an example 2D JPTA receiver architecture 700 according to embodiments of the present disclosure. In this example, there are a total of M*N antenna elements 702 in the array. Signals received by the M*N antennas with their own LNAs and phase shifters are combined into M RF signals. These M signals are down-converted using local oscillator (LO) signals to an intermediate frequency (IF). The M down-converted signals are delayed individually by M delay elements 704 (which may, for example, follow the delay values illustrated in FIG. 5). The M time-delayed signals are then combined to form one IF signal. The IF signal can be sampled by a high speed ADC 706 directly, or can be further down-converted to baseband, and baseband data converters can be used to sample the in-phase (I) and quadrature-phase (Q) samples. Alternatively, the M RF signals can be down-converted directly to baseband and the delay can be applied to the I and Q signals, after which the I and Q are sampled using baseband data converters. For convenience, the examples of the present disclosure use high speed ADCs to sample IF signals and the digitized samples are processed in the modem, but it is understood that baseband conversion may be used instead.

Figure 8:
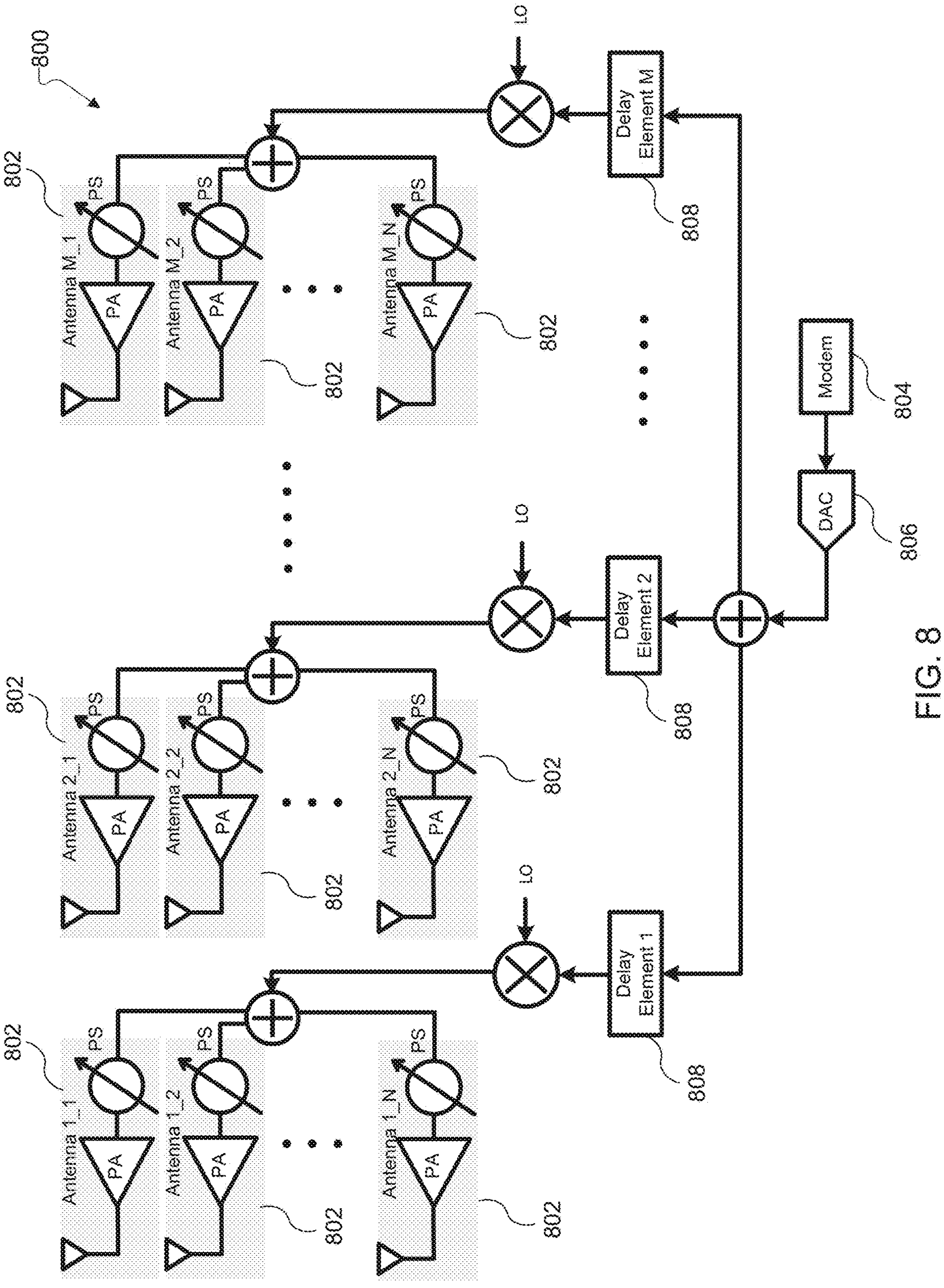
FIG. 8 illustrates an example 2D JPTA transmitter architecture according to embodiments of the present disclosure.

FIG. 8 illustrates an example 2D JPTA transmitter architecture 800 according to embodiments of the present disclosure. In this example, there are a total of M*N antenna elements 802 in the array. The baseband signal from the modem 804 is converted to the analog IF signal using a DAC 806. The analog IF signal is then split into M identical IF signals. These M IF signals are delayed individually by M delay elements 808 (which may, for example, follow the delay values illustrated in FIG. 5). The M time-delayed IF signals are up-converted from IF to RF using local oscillator signals. The RF signals are fed into the M groups of the antenna elements. In each group, N antennas 802 with their own PAs and phase shifters are driven by one of the M time-delayed up-converted signals. For convenience, the following embodiments of the present disclosure are provided in terms of a JPTA receiver using an architecture such as 2D JPTA receiver architecture 700, but it is understood that corresponding JPTA transmitters could be constructed for these embodiments based on the 2D JPTA transmitter architecture 800.

Figure 9:
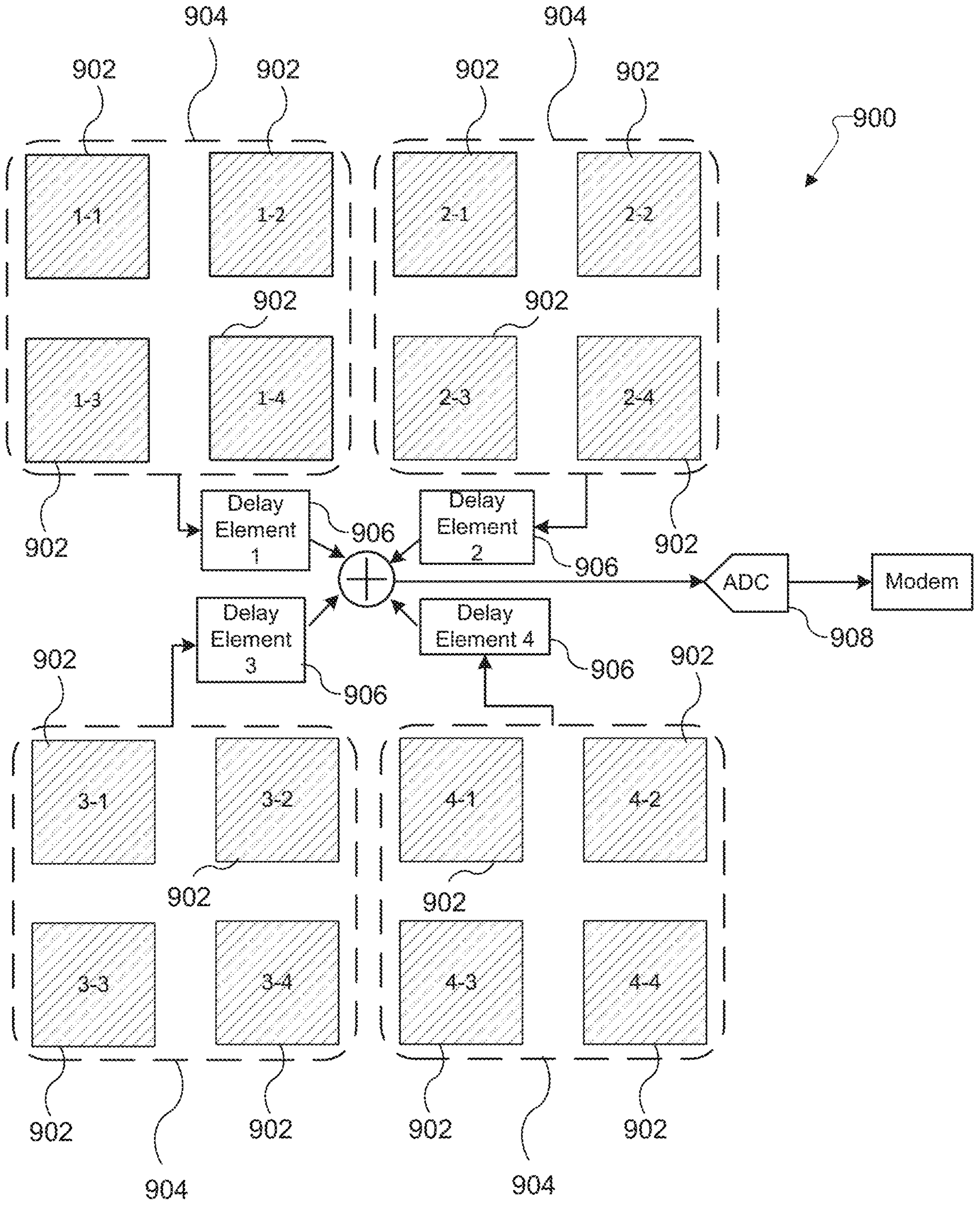
FIG. 9 illustrates a first example antenna grouping according to embodiments of the present disclosure.

FIG. 9 illustrates a first example antenna grouping 900 according to embodiments of the present disclosure. In this example, N=4 antenna elements 902 arranged in 2 rows in the horizontal direction (H) and in 2 columns in the vertical direction (V) (denoted "2-H/2-V") are grouped together. There are M=4 antenna groups 904, for a total of M*N=16 antennas. Following the 2D JPTA receiver architecture 700, a down-converted IF signal comes from each of the M=4 groups, and the IF signals are time-delayed by M=4 delay elements 906 individually. The time-delayed signals are then combined to be fed into the ADC 908 for digitization. It is understood that this is just one example, and each antenna group could be arranged in the format K-H/K-V for any integer value $K=\sqrt{N}$—i.e., each group could be arranged as any size of square. Additionally, the 2D JPTA could be comprised of any number M of such K-H/K-V groups.

Figure 10:
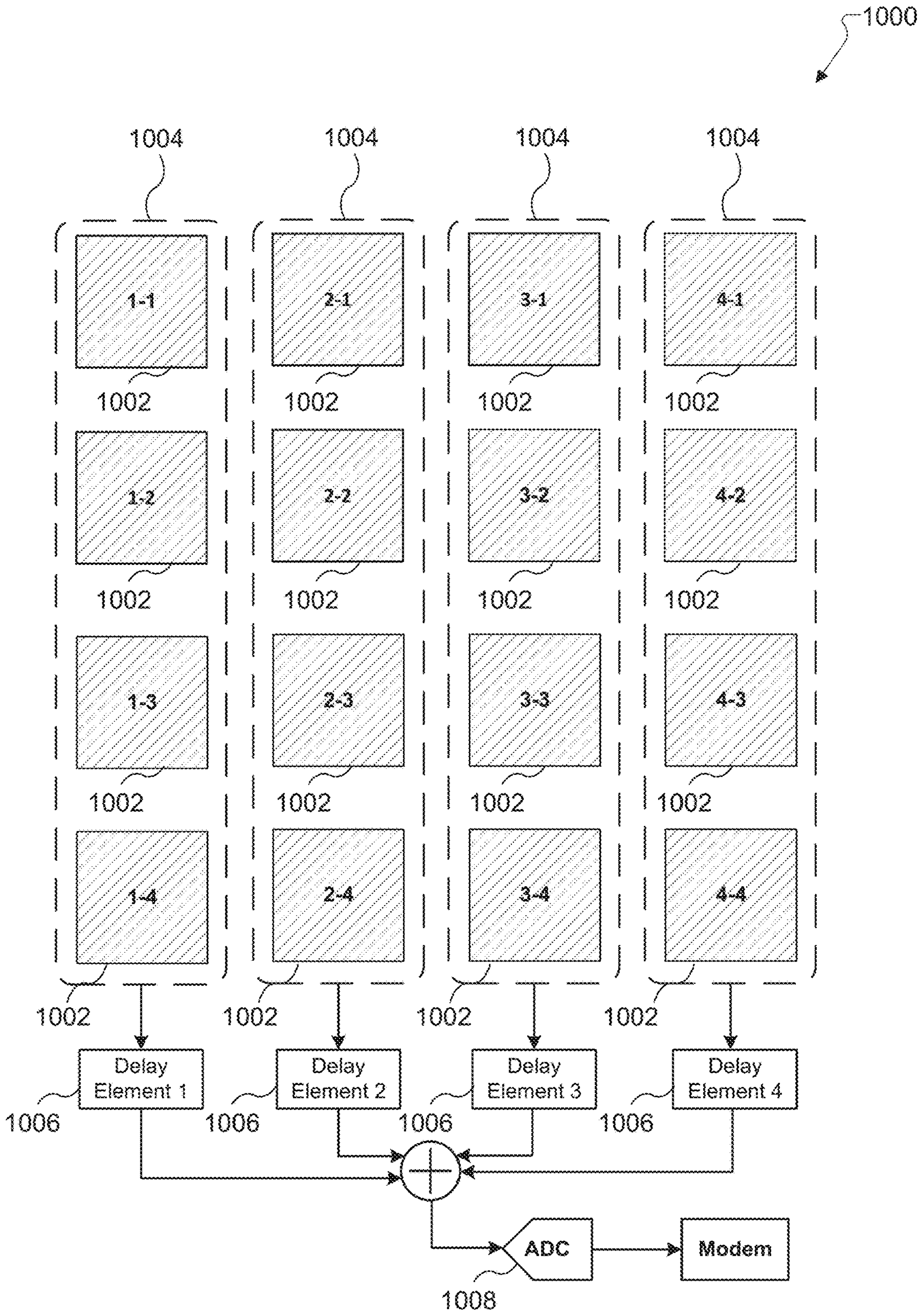
FIG. 10 illustrates a second example antenna grouping according to embodiments of the present disclosure.

FIG. 10 illustrates a second example antenna grouping 1000 according to embodiments of the present disclosure. In this example, N=4 antenna elements 1002 arranged in 4 rows in the horizontal direction and in 1 column in the vertical direction (denoted "4-H/1-V") are grouped together. There are M=4 antenna groups 1004, for a total of M*N=16 antennas. Following the 2D JPTA receiver architecture 700, a down-converted IF signal comes from each of the M=4 groups, and the IF signals are time-delayed by M=4 delay elements 1006 individually. The time-delayed signals are then combined to be fed into the ADC 1008 for digitization. It is understood that this is just one example, and each antenna group could be arranged in the format K-H/1-V for any integer value K=N—i.e., each group could be arranged as one vertical column of any size. Alternatively, each antenna group could be arranged in the format 1-H/K-V for any integer value K=N—i.e., each group could be arranged as one horizontal row of any size. Additionally, the 2D JPTA could be comprised of any number M of such K-H/1-V or 1-H/K-V groups.

Figure 11:
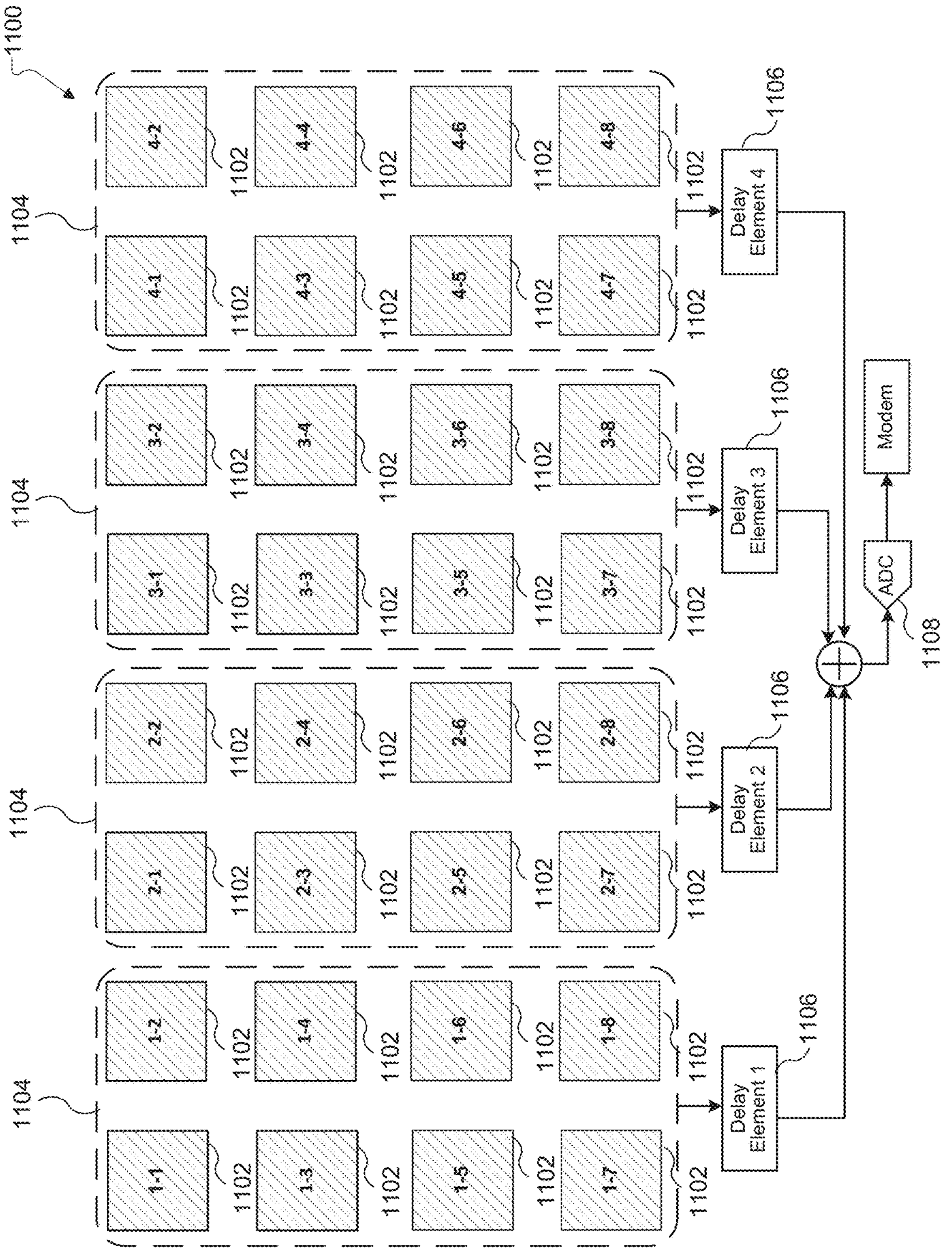
FIG. 11 illustrates a third example antenna grouping according to embodiments of the present disclosure.

FIG. 11 illustrates a third example antenna grouping 1100 according to embodiments of the present disclosure. In this example, N=8 antenna elements 1102 arranged in 4 rows in the horizontal direction and in 2 columns in the vertical direction (denoted "4-H/2-V") are grouped together. There are M=4 antenna groups 1104, for a total of M*N=32 antennas. Following the 2D JPTA receiver architecture 700, a down-converted IF signal comes from each of the M=4 groups, and the IF signals are time-delayed by M=4 delay elements 1106 individually. The time-delayed signals are then combined to be fed into the ADC 1108 for digitization. It is understood that this is just one example, and each antenna group could be arranged in the format K-H/L-V for any integer values K and L, where K*L=N. Additionally, the 2D JPTA could be comprised of any number M of such K-H/L-V groups.

Figure 12A:
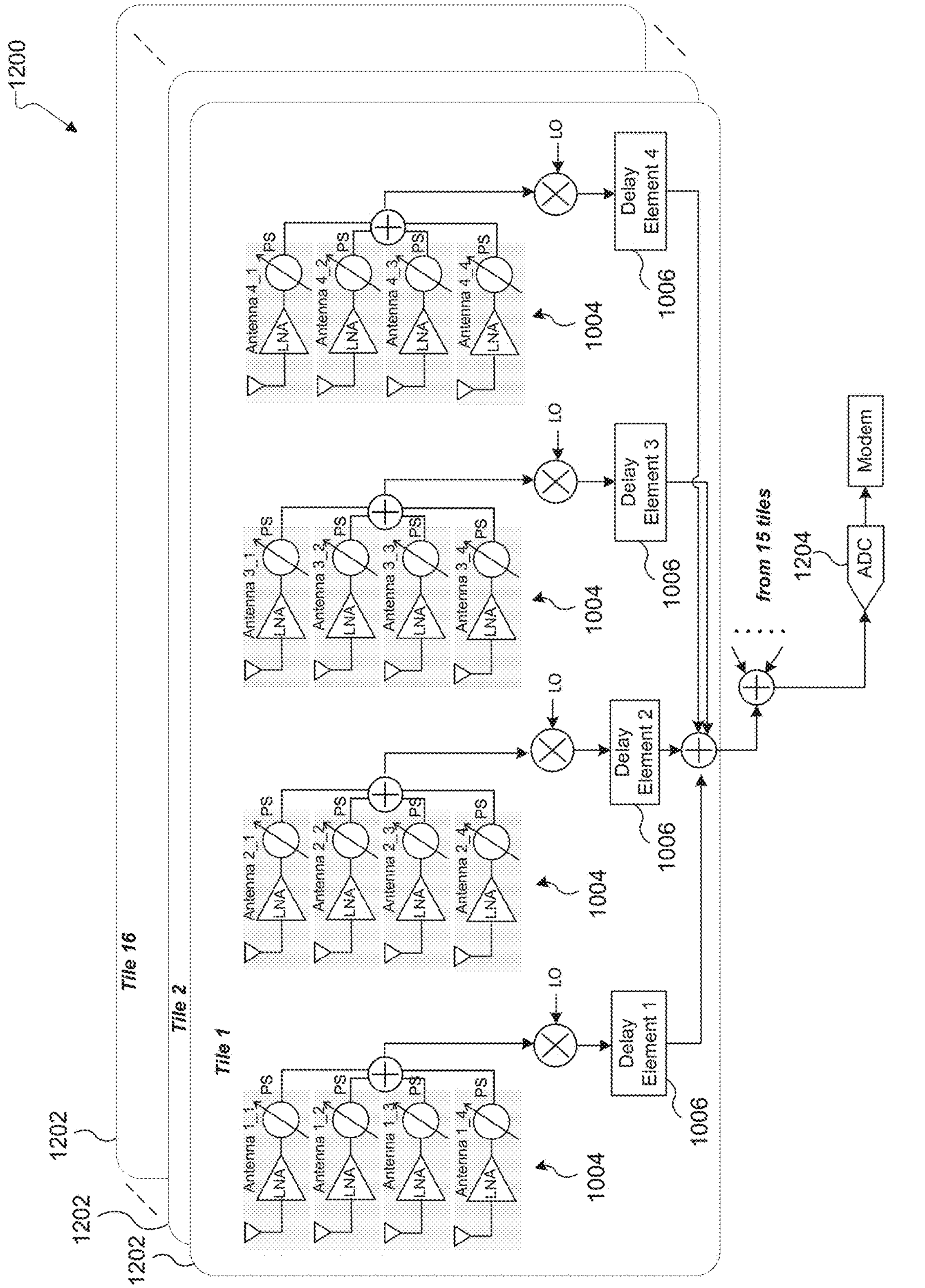
FIGS. 12A-12B illustrate an example of a larger 2D array formed of tiled packages of antenna groups according to embodiments of the present disclosure.
Figure 12B:
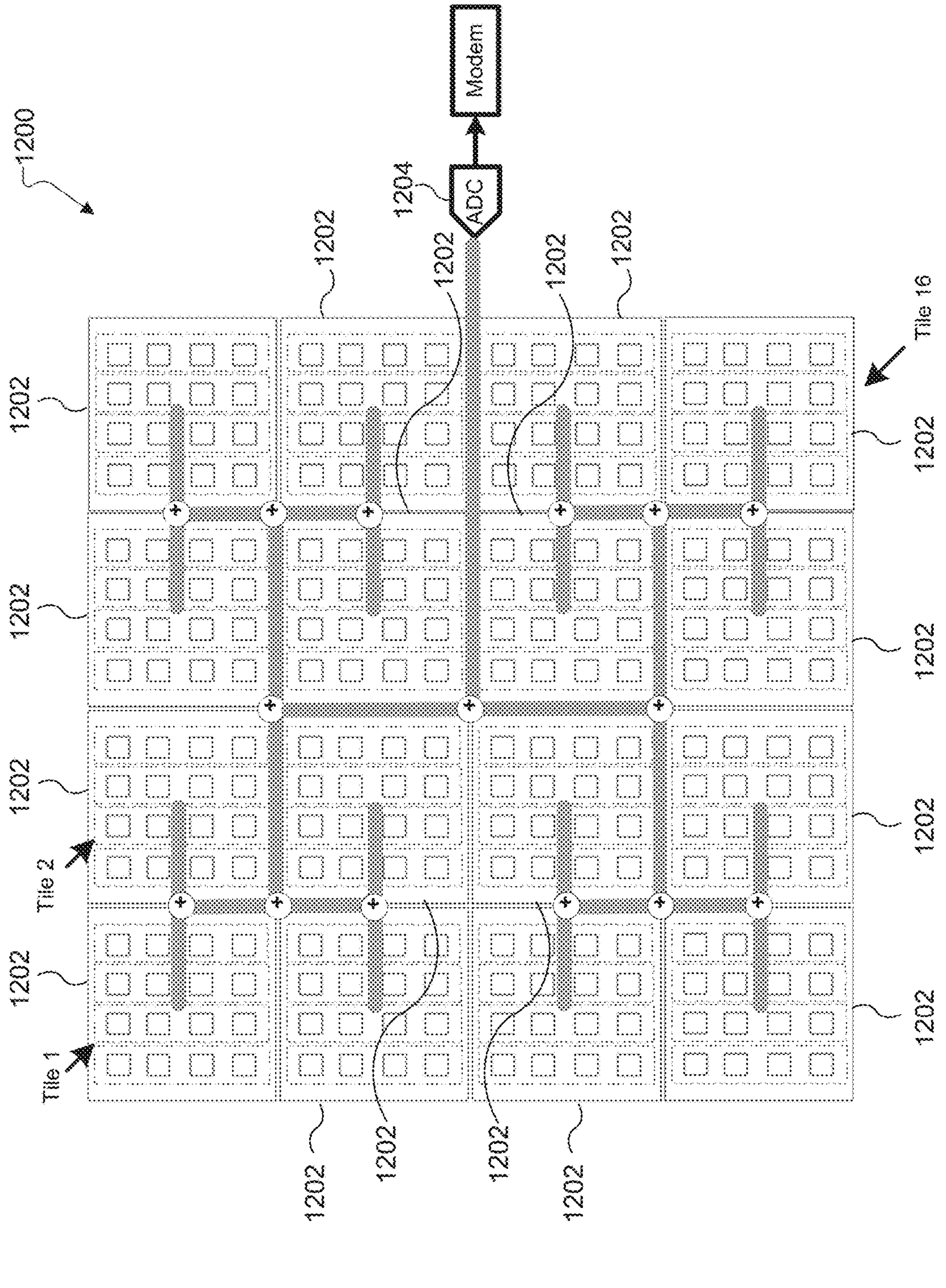

FIGS. 12A-12B illustrate an example of a larger 2D array 1200 formed of tiled packages of antenna groups according to embodiments of the present disclosure. This example is based on the antenna grouping 1000 of FIG. 10. In this example, the M=4 antenna groups 1004 plus the M=4 time delay elements 1006 of antenna grouping 1000 are packaged into a single integrated circuit (IC) package 1202 (i.e., they are implemented on a single chip). Then, the packages 1202 are tiled to form the larger array 1200. As illustrated in FIG. 12B, the signals coming out of each package are combined such that the combined output of the full 256-element array is fed to the ADC 1204 for digitization. Although this example is based on the antenna grouping 1000, it is understood that the same principle can be applied to other antenna groupings, such as antenna groupings 900 and 1100.

Figure 13A:
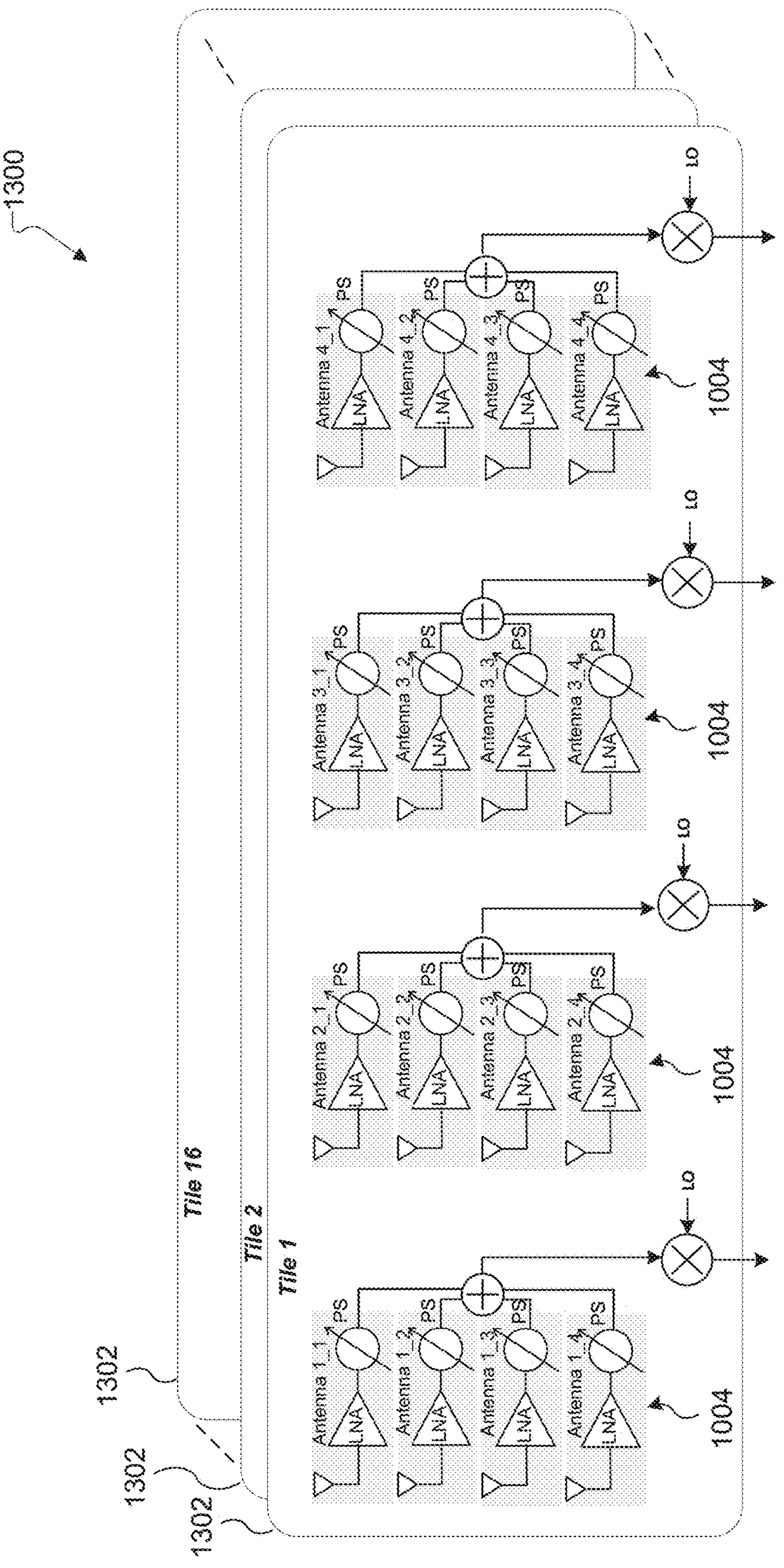
FIGS. 13A-13B illustrate another example of a larger 2D array formed of tiled packages of antenna groups according to embodiments of the present disclosure.
Figure 13B:
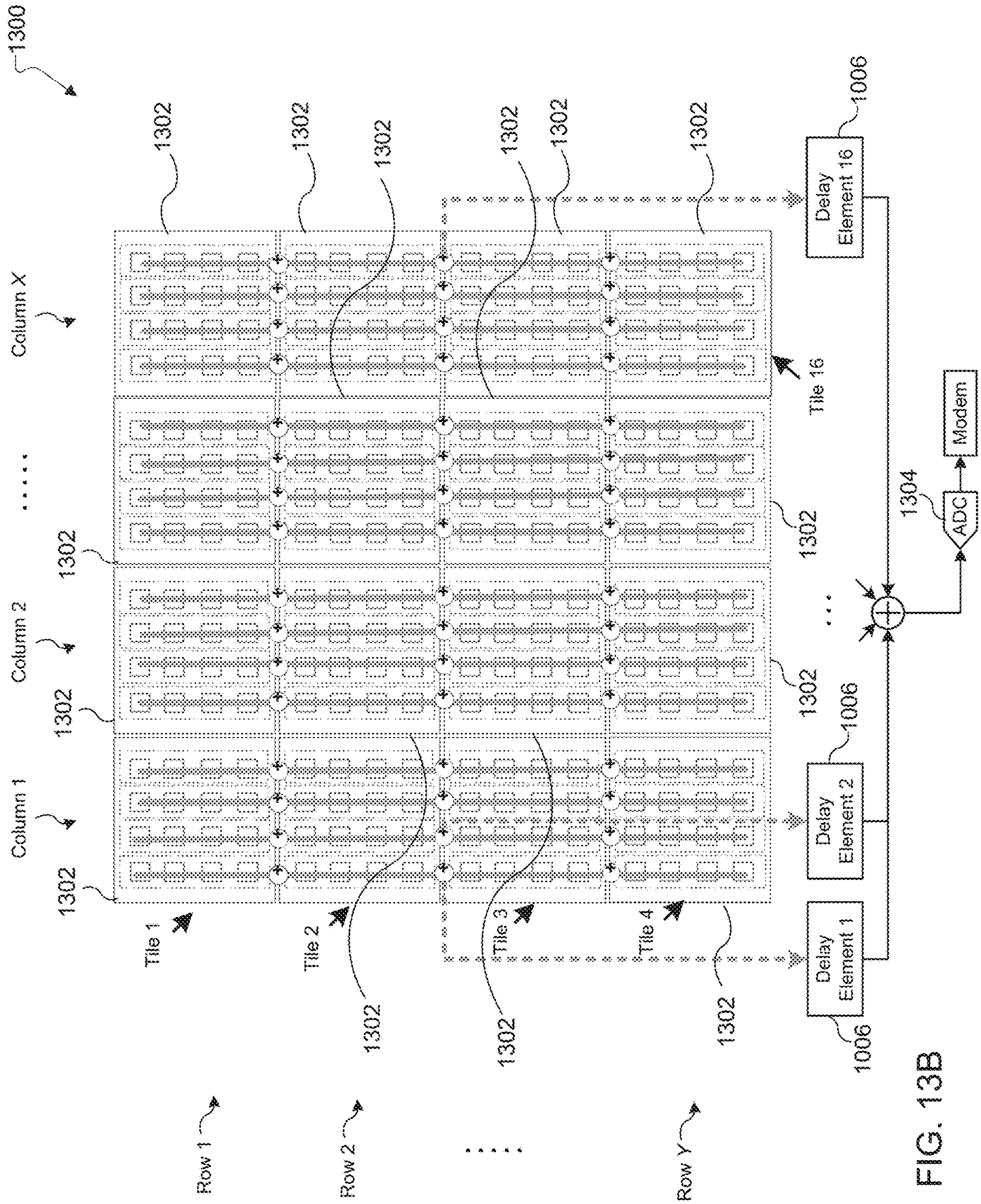

FIGS. 13A-13B illustrate another example of a larger 2D array 1300 formed of tiled packages of antenna groups according to embodiments of the present disclosure. This example is also based on the antenna grouping 1000 of FIG. 10. In this example, the M=4 antenna groups 1004 of antenna grouping 1000 are packaged into a single IC package 1302 without the time delay elements 1006. Then, the packages 1302 are tiled to form the larger array 1300 with time delay elements 1006 external to the antenna packages 1302. As illustrated in FIG. 13B, the array 1300 is comprised of Y=4 rows of packages 1302 in the horizontal direction and X=4 columns of packages 1302 in the vertical direction. The signals coming out of each package (one output signal for each of the M antenna groups 1004 in the package) are combined column-wise and fed into M*X=16 shared time delay elements 1006 such that the combined signals in each column of antenna elements are delayed using a shared time delay element 1006. The combined outputs of the M*X time delay elements 1006 are then combined and fed to the ADC 1304 for digitization. Although this example is based on the antenna grouping 1000, it is understood that the same principle can be applied to other antenna groupings, such as antenna groupings 900 and 1100.

Figure 14:
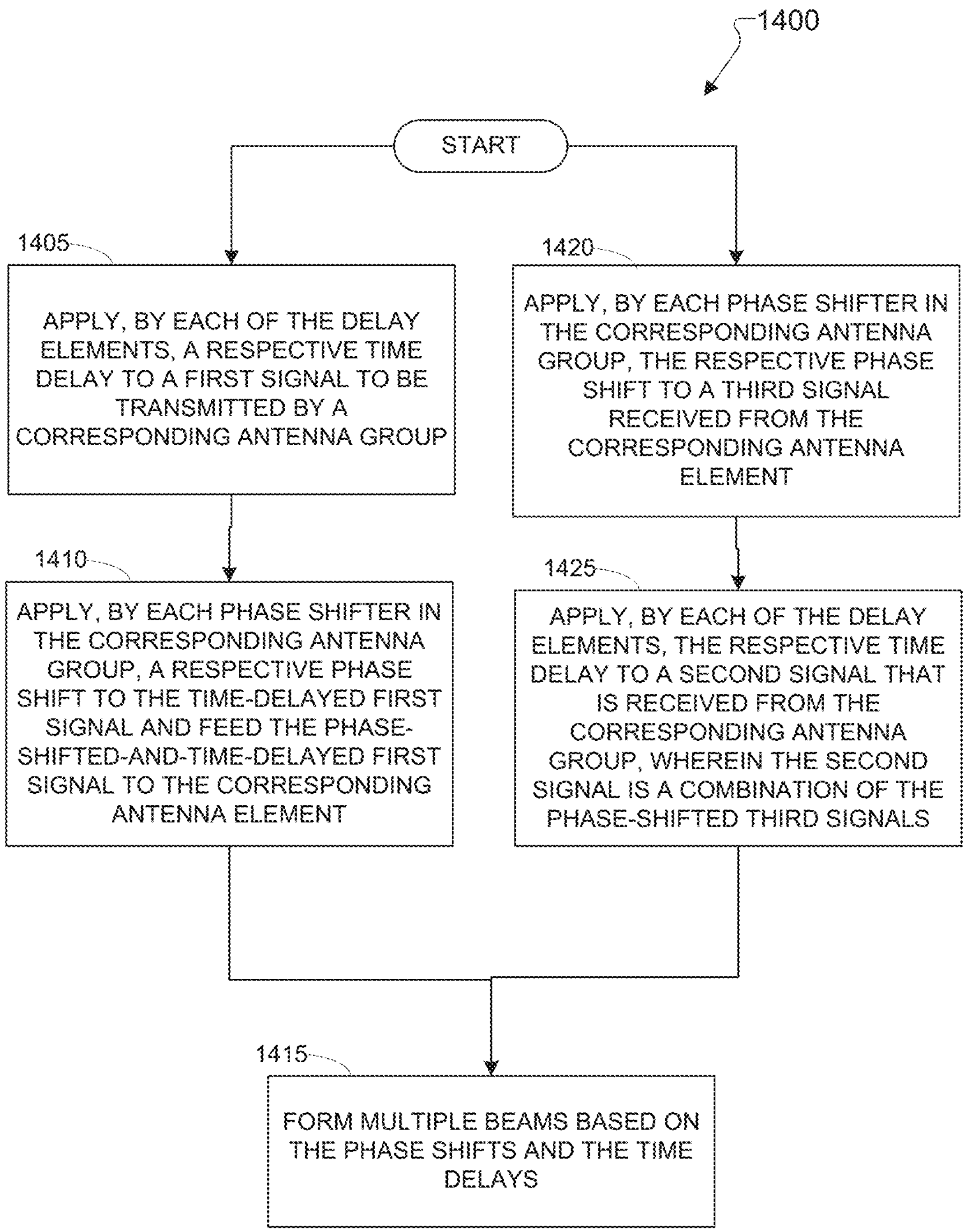
FIG. 14 illustrates an example process for operation of a scalable 2D JPTA according to various embodiments of the present disclosure.

FIG. 14 illustrates an example process 1400 for operation of a scalable 2D JPTA according to various embodiments of the present disclosure. The process 1400 of FIG. 14 is performed by a device that is equipped with a 2D antenna array which may be a JPTA comprising a first number M of antenna groups and M delay elements, each delay element operably coupled to a corresponding one of the antenna groups. The M antenna groups each comprise a second number N of antenna elements and N phase shifters, each antenna element operably coupled to a corresponding one of the phase shifters. This 2D JPTA architecture may correspond to the arrays 1200 or 1300, or any other suitable architecture. The antenna groups in the 2D JPTA architecture may correspond to any of the antenna groups 900, 1000, or 1100, or any other suitable antenna groups. The process 1400 of FIG. 14 may performed by a 5G/NR base station (e.g., a gNB 102) or by any other suitable wireless communication device (e.g., 6G and beyond base stations).

For a transmit beamforming operation, at step 1405 each of the delay elements applies a respective time delay to a first signal to be transmitted by the antenna group corresponding to that delay element. The first signal is generated by a modem and converted to an analog signal by a DAC before being provided to the delay elements.

Next, each phase shifter in the antenna group applies a respective phase shift to the time-delayed first signal and feeds the phase-shifted-and-time-delayed first signal to the antenna element corresponding to that phase shifter (step 1410).

At step 1415, the antenna groups form multiple beams based on the phase shifts and the time delays. In this case, the beams are transmit beams, and are used to transmit the first signal. The time delays are configured to produce a beam spread in a first dimension of the 2D antenna array such that the multiple transmit beams are formed in different directions. This allows for a combination of vertical beaming steering and horizontal beam spreading to generate a frequency dependent beam spread.

Referring now to step 1420, for a receive beamforming operation each phase shifter in each antenna group is configured to apply its respective phase shift to a third signal received from the antenna element corresponding to that phase shifter.

Next, each delay element applies its respective time delay to a second signal that is received from the antenna group corresponding to that delay element (step 1425). The second signal is a combination of the phase-shifted third signals output by the corresponding phase shifters.

Returning to step 1415, the antenna groups form multiple beams based on the phase shifts and the time delays. In this case, however, the beams are receive beams, and are used to receive the third signal. The time delays are again configured to produce a beam spread in a first dimension of the 2D antenna array such that the multiple receive beams are formed in different directions. This allows for a combination of vertical beaming steering and horizontal beam spreading to generate a frequency dependent beam spread.

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A two-dimensional (2D) antenna array comprising:

a first number (M) of antenna groups that each comprise a second number (N) of antenna elements and N phase shifters, each antenna element operably coupled to a corresponding one of the phase shifters; and M time delay elements arranged in parallel to each other, each time delay element operably coupled to a corresponding one of the antenna groups and configured to:

simultaneously apply a respective time delay to a first signal to be transmitted by the corresponding antenna group, the first signal being an analog signal, wherein:

each phase shifter in the corresponding antenna group is configured to apply a respective phase shift to the time-delayed first signal and feed the phase-shifted-and-time-delayed first signal to the corresponding antenna element, or apply the respective time delay to a second signal that is received from the corresponding antenna group, wherein:

each phase shifter in the corresponding antenna group is configured to apply the respective phase shift to a third signal received from the corresponding antenna element; and the second signal is a combination of the phase-shifted third signals, wherein the antenna groups are further configured to form multiple beams based on the phase shifts and the time delays, and wherein the time delays are configured to produce a beam spread in a first dimension of the 2D antenna array such that the multiple beams are formed in different directions.

2. The 2D antenna array of claim 1, wherein:

the phase shifts are configured to produce beam steering of the multiple beams in a second dimension of the 2D antenna array, and the beam spread in the first dimension in combination with the beam steering in the second dimension produces a frequency dependent beam spread in the multiple beams.

3. The 2D antenna array of claim 1, wherein the antenna elements of each antenna group are arranged into an equal number of rows along the first dimension and columns along a second dimension of the 2D antenna array.

4. The 2D antenna array of claim 1, wherein the antenna elements of each antenna group are arranged into one column along a second dimension of the 2D antenna array.

5. The 2D antenna array of claim 1, wherein:

the antenna elements of each antenna group are arranged into a third number (K) of rows along the first dimension and a fourth number (L) of columns along a second dimension of the 2D antenna array, and $$K*L=N.$$

6. The 2D antenna array of claim 1, wherein:

the M antenna groups and the corresponding M time delay elements are provided in a single integrated circuit (IC), and the 2D antenna array further comprises a plurality of such ICs.

7. The 2D antenna array of claim 1, wherein:

the M antenna groups are provided in a single IC, the 2D antenna array comprises a plurality of such ICs arranged into a fifth number (Y) of rows along the first dimension and a sixth number (X) of columns along a second dimension of the 2D antenna array, the 2D antenna array comprises a total of M*X time delay elements located external to the antenna group ICs, M of the M*X time delay elements correspond to each of the X columns, and for each column:

each time delay element of the corresponding M time delay elements is operably coupled to a corresponding one of the antenna groups in each of the ICs in that column; and the first signal is to be transmitted by each of the corresponding antenna groups and each time delay element of the corresponding M time delay elements is configured to apply the respective time delay to the first signal; or second signals are received from each of the corresponding antenna groups and each time delay element of the corresponding M time delay elements is configured to apply the respective time delay to a combination of the second signals.

8. A method of operation of a two-dimensional (2D) antenna array comprising a first number (M) of antenna groups that each comprises a second number (N) of antenna elements and N phase shifters, each antenna element operably coupled to a corresponding one of the phase shifters, and M time delay elements arranged in parallel to each other, each time delay element operably coupled to a corresponding one of the antenna groups, the method comprising:

simultaneously applying, by each of the time delay elements, a respective time delay to a first signal to be transmitted by the corresponding antenna group, the first signal being an analog signal, and applying, by each phase shifter in the corresponding antenna group, a respective phase shift to the time-delayed first signal and feeding the phase-shifted-and-time-delayed first signal to the corresponding antenna element; or applying, by each of the time delay elements, the respective time delay to a second signal that is received from the corresponding antenna group and applying, by each phase shifter in the corresponding antenna group, the respective phase shift to a third signal received from the corresponding antenna element, wherein the second signal is a combination of the phase-shifted third signals; and forming multiple beams based on the phase shifts and the time delays, wherein the time delays are configured to produce a beam spread in a first dimension of the 2D antenna array such that the multiple beams are formed in different directions.

9. The method of claim 8, wherein:

the phase shifts are configured to produce beam steering of the multiple beams in a second dimension of the 2D antenna array, and the beam spread in the first dimension in combination with the beam steering in the second dimension produces a frequency dependent beam spread in the multiple beams.

10. The method of claim 8, wherein the antenna elements of each antenna group are arranged into an equal number of rows along the first dimension and columns along a second dimension of the 2D antenna array.

11. The method of claim 8, wherein the antenna elements of each antenna group are arranged into one column along a second dimension of the 2D antenna array.

12. The method of claim 8, wherein:

the antenna elements of each antenna group are arranged into a third number (K) of rows along the first dimension and a fourth number (L) of columns along a second dimension of the 2D antenna array, and $$K*L=N.$$

13. The method of claim 8, wherein:

the M antenna groups and the corresponding M time delay elements are provided in a single integrated circuit (IC), and the 2D antenna array further comprises a plurality of such ICs.

14. The method of claim 8, wherein:

the M antenna groups are provided in a single IC, the 2D antenna array comprises a plurality of such ICs arranged into a fifth number (Y) of rows along the first dimension and a sixth number (X) of columns along a second dimension of the 2D antenna array, the 2D antenna array comprises a total of M*X time delay elements located external to the antenna group ICs, M of the M*X time delay elements correspond to each of the X columns, for each column, each time delay element of the corresponding M time delay elements is operably coupled to a corresponding one of the antenna groups in each of the ICs in that column, and the method further comprises:

applying, by each of the M time delay elements, the respective time delay to the first signal, wherein the first signal is to be transmitted by each of the corresponding antenna groups in each of the ICs; or applying, by each of the M time delay elements, the respective time delay to a combination of second signals that are received from each of the corresponding antenna groups in each of the ICs.

15. A non-transitory computer-readable medium configured to store instructions that, when executed by a processor, cause a two-dimensional (2D) antenna array comprising a first number (M) of antenna groups that each comprise a second number (N) of antenna elements and N phase shifters, each antenna element operably coupled to a corresponding one of the phase shifters, and M time delay elements arranged in parallel to each other, each time delay element operably coupled to a corresponding one of the antenna groups, to:

simultaneously apply, via each of the time delay elements, a respective time delay to a first signal to be transmitted by the corresponding antenna group, the first signal being an analog signal, and apply, via each phase shifter in the corresponding antenna group, a respective phase shift to the time-delayed first signal and feed the phase-shifted-and-time-delayed first signal to the corresponding antenna element; or apply, via each of the time delay elements, the respective time delay to a second signal that is received from the corresponding antenna group and apply, via each phase shifter in the corresponding antenna group, the respective phase shift to a third signal received from the corresponding antenna element, wherein the second signal is a combination of the phase-shifted third signals; and form multiple beams based on the phase shifts and the time delays, wherein the time delays are configured to produce a beam spread in a first dimension of the 2D antenna array such that the multiple beams are formed in different directions.

16. The non-transitory computer-readable medium of claim 15, wherein:

the phase shifts are configured to produce beam steering of the multiple beams in a second dimension of the 2D antenna array, and the beam spread in the first dimension in combination with the beam steering in the second dimension produces a frequency dependent beam spread in the multiple beams.

17. The non-transitory computer-readable medium of claim 15, wherein the antenna elements of each antenna group are arranged into an equal number of rows along the first dimension and columns along a second dimension of the 2D antenna array.

18. The non-transitory computer-readable medium of claim 15, wherein the antenna elements of each antenna group are arranged into one column along a second dimension of the 2D antenna array.

19. The non-transitory computer-readable medium of claim 15, wherein:

the antenna elements of each antenna group are arranged into a third number (K) of rows along the first dimension and a fourth number (L) of columns along a second dimension of the 2D antenna array, and $$K*L=N.$$

20. The non-transitory computer-readable medium of claim 15, wherein:

the M antenna groups and the corresponding M time delay elements are provided in a single integrated circuit (IC), and the 2D antenna array further comprises a plurality of such ICs.

* * * * *